July 7, 1942.  W. R. RAMSAUR  2,288,598
INTER-COOLER
Filed July 16, 1940  2 Sheets-Sheet 1

WALTER R. RAMSAUR,
INVENTOR.
BY
ATTORNEY.

WALTER R. RAMSAUR,
INVENTOR.

BY
ATTORNEY.

Patented July 7, 1942

2,288,598

UNITED STATES PATENT OFFICE 2,288,598

INTERCOOLER

Walter R. Ramsaur, Los Angeles, Calif., assignor to The Garrett Corporation, Airesearch Manufacturing Company division, Los Angeles, Calif., a corporation of California Application July 16, 1940, Serial No. 345,756

4 Claims. (Cl. 257—236)

My invention relates in general to devices wherein heat is transferred from one fluid to another, and relates in particular to an intercooler for use with superchargers such as employed with aircraft engines.

In devices of this general character it is customary to provide a passage for the flow of a first fluid and to extend across this passage thin metal tubes through which a second fluid is passed in heat exchanging relation to the first fluid. An object of the present invention is to provide a device of this character wherein increased efficiency of heat transfer between the first and second fluid is accomplished by control of the flow of these fluids.

It is an object of the present invention to provide a device of the character set forth in the foregoing having streamlined fluid guiding means at the mouth of the fluid passages. In this device the fluid guiding means reduces turbulence in the fluids entering the passages so that the flow-retarding resistance in the fluid is minimized and a greater velocity and quantity of fluid is permitted to flow through the passages.

It is an object of the invention to provide means for controlling the flow of both the coolant and of the fluid to be cooled so that greater efficiency in the transfer of heat will be obtained.

A further object of the invention is to so form and place the tubes of an inter-cooler that paths of flow for a fluid will be established in which there will be a minimum of flow retarding disturbance and wherein there will be an increase in the ratio of the cooling tube surface to the cooling tube cross-sectional area.

A further object of the invention is to provide an inter-cooler having a plurality of tubes in side-by-side relation, these tubes having diametrically opposed flat parallel walls and being so placed that the flat walls are substantially aligned and define passages through which a flow of fluid is conducted.

A further object of the invention is to provide an inter-cooler wherein tubes of flattened cross-sectional area are extended across a fluid passage, and it is a further object to provide a device of this character wherein tubes of round cross-section are secured in substantially parallel marginal walls of a fluid passage and are then flattened between such marginal walls and in a direction corresponding to the flow of fluid through the passage.

It is a further object of the invention to provide an inter-cooler wherein the tubes are disposed in banks and are flattened in a direction lengthwise of the banks so that portions of adjacent tubes are brought substantially into contact so that the tubes cooperate to form continuous walls which define passages for the flow of fluid.

It is an object of the invention to provide simple means for securing the streamlined fluid guide members in operative relation to the tubes of an inter-cooler.

I have found that expanding tubes through the full length thereof sets up strains on the end headers causing them to warp, for the reason that when a tube is expanded diametrally it will generally shrink in length. In my present invention I expand the tube at the points intermediate their lengths where they pass through the intermediate supporting baffles or plates.

Further objects and advantages of the invention will be brought out in the following part of the specification.

Referring to the drawings which are for illustrative purposes only:

Figure 1:
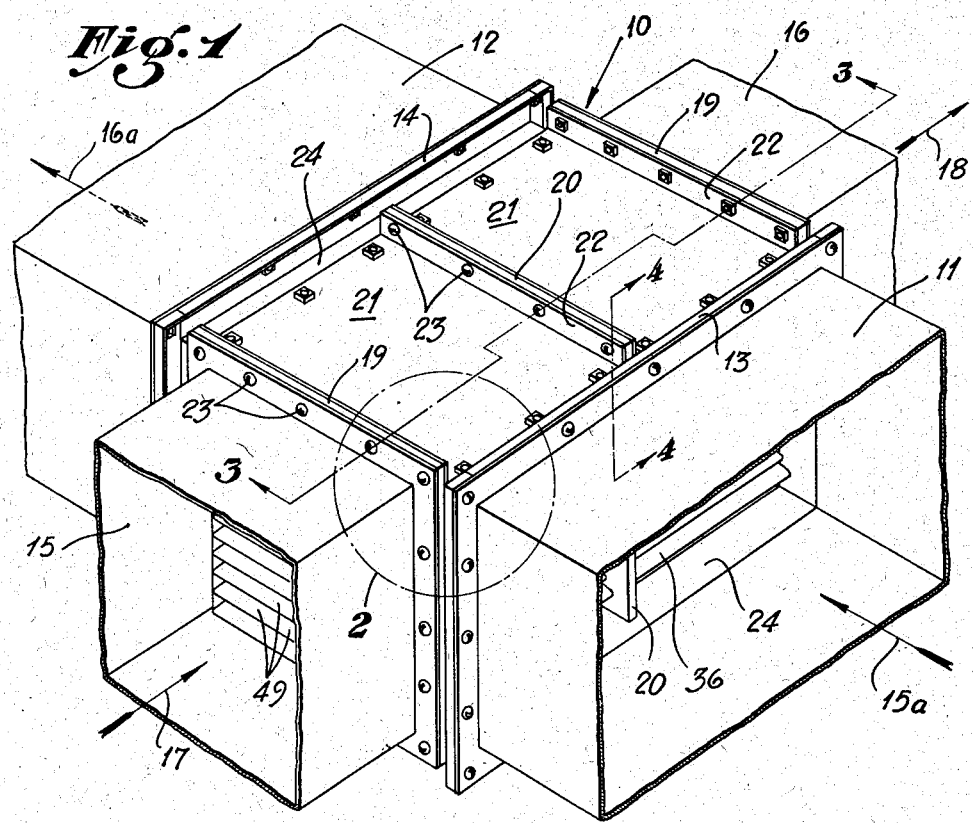
Fig. 1 is a perspective view showing a preferred embodiment of my inter-cooler with fluid ducts connected thereto.

In Fig. 1 is shown an inter-cooler 10 having fittings 11 and 12 connected to the front and rear flanges 13 and 14 thereof, whereby a fluid may be passed through the inter-cooler 10 as indicated by arrows 15a and 16a. To conduct a second fluid through a plurality of tubes which extend across the inter-cooler from side-to-side thereof I show fittings 15 and 16, through which the second fluid may pass as indicated by arrows 17 and 18.

Figure 3:
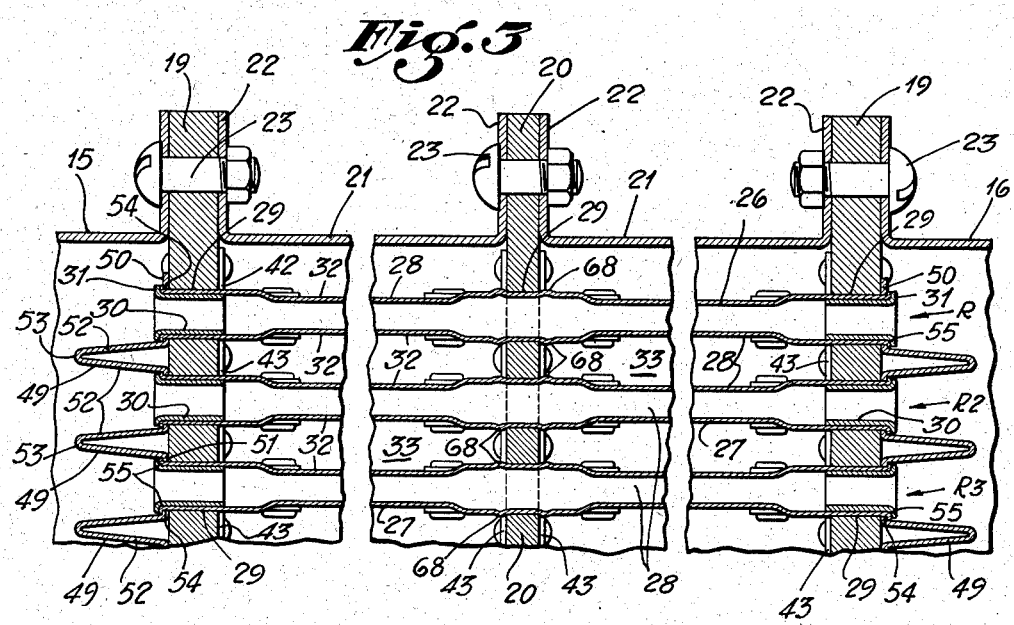
Fig. 3 is an enlarged fragmentary section taken on a plane indicated by the line 3—3 of Fig. 1.
Figure 4:
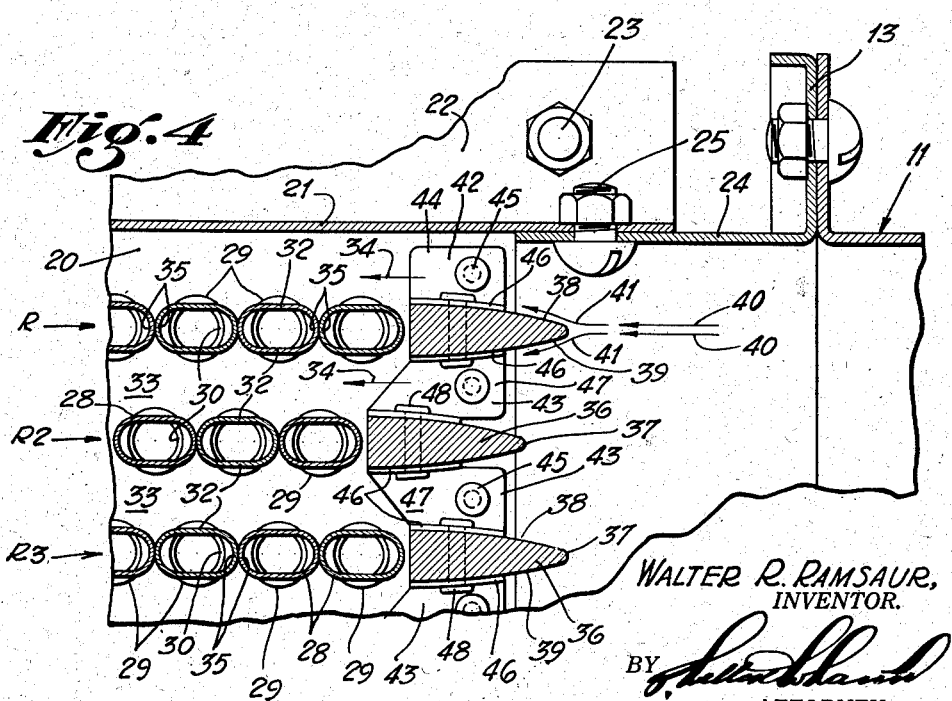
Fig. 4 is an enlarged fragmentary section taken as indicated by the line 4—4 of Fig. 1.

As best shown in Figs. 1 and 3, the inter-cooler 10 comprises a pair of vertical side plates 19, an intermediate plate 20, and four top and bottom wall members 21 provided with flanges 22 whereby they may be secured to the upper and lower edges of the vertical plates 19 and 20 by means of bolts 23. The side plates 19 and the top and bottom walls 21 form a box which is open at the front and rear ends thereof. The front and rear flanges 13 and 14 are substantially identical in form and are connected in the front and rear openings of the inter-cooler 10 by means of a rectangular frame 24 having a portion to project within the edges of the plates 19 and the upper and lower wall members 21, as shown in Fig. 4, and being secured by means of bolts 25.

Horizontal banks 26, 27, etc., of tubes 28 are disposed within the shell of the inter-cooler 10 so as to pass from one side wall 19 to the other, the central portions of these tubes 28 being supported by the intermediate wall 20. As shown in Figs. 3 and 4, horizontal openings 29 are formed in the plates 19 and 20 in horizontal rows R, R2, R3, etc., the positions of these rows of holes defining the horizontal planes in which the banks of tubes 28 will lie.

Figure 2:
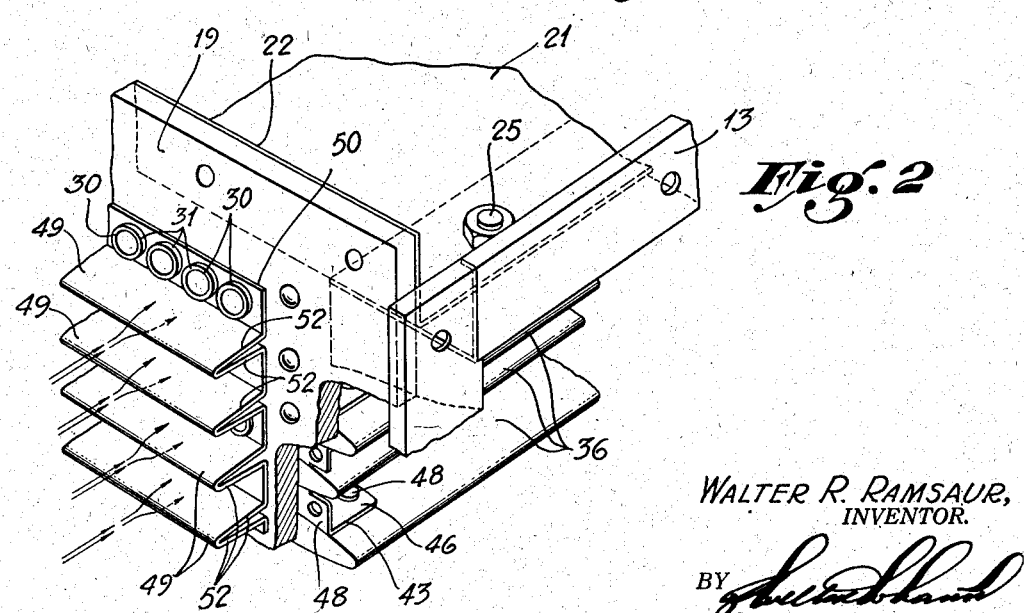
Fig. 2 is an enlarged fragmentary section of the corner of the inter-cooler included within the dotted encircling line 2 of Fig. 1.

The ends of the tubes 28 are secured in the openings 29 of the side plates 19, preferably by expanding the ends of these tubes in the openings, and, as shown in Figs. 2 and 3, supplementary securing means may be employed in the form of ferrules 30 which are expanded within the end portions of the tubes 28 lying in the openings 29, such ferrules being shown with lips 31.

As shown in Fig. 3, the tubes 28 are expanded into engagement with the walls of the openings in the intermediate baffle or plate 20. Accordingly, the tubes 28 are not expanded throughout their entire length. That portion of the tube 28 which lies within the opening 29 of the wall 20 is expanded into engagement with the wall of the opening 29, and the portions of the tube 28 adjacent the ends of the opening 29 are expanded so as to produce shallow annular bulges 68, as shown in Fig. 3. The bulges 68 form shoulders adjacent the ends of the opening 29 to cooperate in limiting axial relative movement of the tubes 28 and the wall 20.

The tubes 28 are flattened intermediate the ends thereof, so that the upper and lower portions 32 of the metal wall of the tubes will extend in horizontal planes, thereby providing spaced horizontal walls defining horizontal air passages 33 between the banks of tubes 28 through which a fluid, such as air, may flow, as indicated by arrows 34. The spacing of the tubes 28 is such that when they are flattened, the side portions 35 thereof will engage, as shown in Fig. 4, thereby forming of each bank of tubes a substantially continuous horizontal wall. The effect of flattening the tubes 28 is to decrease the cross-sectional area of the space within each tube without decrease in the area of the tube wall, thereby increasing the ratio of the area of the tube surface to the volume of the interior space of the tube in which a fluid is passed in a heat exchanging relation to the fluid which moves through the horizontal spaces 33.

At the front and rear edges of the banks of tubes 28 I place air guiding means 36 to reduce the agitation or turbulence of the air as it passes between the spaces 33 and the exterior. As best shown in Fig. 4 these air guiding means comprise streamlined bars 36 secured so as to lie adjacent the edges of the banks of tubes 28. The bars 36 each have a relatively narrow rounded front edge 37 with gradually expanding and slightly curved upper and lower walls 38 and 39. The air entering the mouth of the inter-cooler 10, as indicated by arrows 40, is parted by the forward edges 37 of the streamlined bars 36, and, as indicated by arrows 41, is caused to flow relatively smoothly over the upper and lower surfaces or walls 38 and 39 of the bars 36 into the passages 33 between the banks of tubes 28.

The bars 36 are secured between the vertical edge portions of the plates 19 and 20 by means of brackets 42 and 43. The brackets 42 each have a supporting plate portion 44 for securement to a plate 19 and 20 by means of a rivet 45, and an outstanding flange 46. The brackets 43 each have a plate portion 47 for securement to a plate 19 and 20, and upper and lower flanges 46 to engage adjacent bars 36, the flanges 46 being secured to the ends of the bars 36 by use of rivets 48. The openings 29 of each row R, R2, etc., are placed in laterally offset relation to the openings of the rows adjacent thereto, and the openings 29 in alternate horizontal rows are vertically aligned. Accordingly, the bars 36 are supported by the brackets 42 and 43 in staggered relation in accordance with the staggered relation of the ends of the banks of tubes 28.

Air guiding means are provided at the ends of the tubes 28 to smooth out the flow of air as it enters and leaves the tubes, thereby reducing turbulence and the flow retarding resistance caused by such turbulence. As shown in Figs. 2 and 3 the air guiding means for the ends of the tubes 28 comprises vertically spaced ribs 49 secured to the outer faces of the side walls 19. The ribs 49 are disposed in horizontal planes spaced between the horizontal planes defined by the banks 26, 27, etc., of the tubes 28 so that these ribs 49 will occupy positions between the ends of the tubes of adjacent banks of tubes. As shown in Fig. 2, the ribs 49 may be formed by bending a plate 50 along horizontal lines so that there will be a plurality of vertical plate portions 51 in a common plane, with outstanding plate portions 52 along the edges thereof, the outer edges of adjacent plate portions 52 being connected by rounded or cylindric wall portions 53 so that ridges are provided having rounded front edges with diverging surfaces formed by the wall portions 52. The vertical sections 51 have openings 54 therein positioned to correspond with the openings 29 of the side plates 19, so that the extremities 55 of the tubes 28 may project through the openings 54 and be flanged thereover, thereby holding the formed plate member 50 against the outer face of a side plate 19 of the inter-cooler 10. The ferrules 30 are positioned within the ends of the tubes 28 so that the flanges or lips 31 of these ferrules will lie over the flanges 55 of the tube ends, to reinforce the same and supplement the function of securing the plates 50 in operative position.

In the preferred use of the invention, the air to be cooled is passed through the tubes 28, such air being fed to the tubes through the fittings 15, and, after it leaves the rear end of the tube, being carried to the carburetors of the engine or engines through the fitting 16. The coolant air is passed through the inter-cooler 10 as indicated by arrows 15a and 16a. Although I have shown front and rear fittings 11 and 12, these fittings need not always be employed, as, for example, when the inter-cooler 10 is placed in such position that it will be exposed to a flow of air. However, in general practice the fittings 11 form parts of ducts to connect the inter-cooler 10 with air ports in the aircraft structure.

I claim as my invention:

1. In an inter-cooler of the character described, the combination of: a pair of opposed walls and interconnecting walls forming a fluid passage, said pair of opposed walls having openings spaced in planes extending lengthwise of said passage; means for directing a flow of fluid through said passage lengthwise thereof; banks of tubes placed so as to pass across said passage, said tubes having the ends thereof secured in said openings of said opposed walls; streamlined fluid guiding members placed at the ends of said banks of tubes, so as to reduce the turbulence and reduction of velocity of flow of fluid through the spaces between said banks of tubes; and fluid guide means disposed adjacent the outer face of at least one of said opposed walls comprising a continuous plate bent along parallel lines so as to provide outstanding fins between the mouths of said tubes with a plurality of holes between said fins aligned with said openings to guide fluid into said openings and minimize the turbulence in the fluid as it enters said openings.

2. In an inter-cooler of the character described, the combination of: a pair of opposed walls and interconnecting walls forming a fluid passage, said pair of opposed walls having openings spaced in planes extending lengthwise of said passage; means for directing a flow of fluid through said passage lengthwise thereof; banks of tubes placed so as to pass across said passage, said tubes having the ends thereof secured in said openings of said opposed walls; and air guide means for said openings at the ends of said tubes, comprising a plate placed adjacent the outer face of one of said opposed walls, having openings to receive the ends of said tubes and ribs extending outward in planes lying between the planes of said banks of tubes, said ribs having relatively narrow outer edges and side walls which diverge from said edges toward said openings and the extremities of said tubes having flanges outside the outer face of said plate.

3. In an intercooler of the character described, the combination of: a pair of opposed walls and interconnecting walls forming a fluid passage, said pair of opposed walls having openings spaced in planes extending lengthwise of said passage; banks of tubes placed so as to pass across said passage, said tubes having the ends thereof secured in said openings of said opposed walls; and fluid guide means for the ends of said openings at the ends of said tubes, comprising a plate member secured to the outer face of one of said opposed walls and formed so as to provide outstanding ribs disposed in planes lying between said planes of said banks of tubes, said ribs having relatively narrow outer edges and side walls which diverge from said edges toward said openings, there being openings in said plate between said ribs to coincide with the ends of said tubes and flanged ferrules extending into the ends of said tubes to secure said plate against said opposed wall.

4. In an inter-cooler of the character described, the combination of: a pair of opposed walls and interconnecting walls forming a fluid passage, said pair of opposed walls having openings spaced in planes extending lengthwise of said passage; means for directing a flow of fluid through said passage lengthwise thereof; banks of tubes having round ends placed so as to pass across said passage, said tubes having the ends thereof secured in said openings of said opposed walls; and air guide means for the ends of said openings at the ends of said tubes, comprising a plate member secured to the outer face of one of said opposed walls and formed so as to provide outstanding ribs disposed in planes lying between said planes of said banks of tubes, said ribs having relatively narrow outer edges and side walls which diverge from said edges toward said openings, there being openings in said plate between said ribs to coincide with the ends of said tubes and flanged ferrules extending into the ends of said tubes to secure said plate against said opposed wall.

WALTER R. RAMSAUR.